United States Patent
Levi et al.

(10) Patent No.: US 11,917,045 B2
(45) Date of Patent: *Feb. 27, 2024

(54) SCALABLE SYNCHRONIZATION OF NETWORK DEVICES

(71) Applicant: MELLANOX TECHNOLOGIES, LTD., Yokneam (IL)

(72) Inventors: Dotan David Levi, Kiryat Motzkin (IL); Arnon Sattinger, Zichron Yaakov (IL); Natan Manevich, Ramat Hasharon (IL); Wojciech Wasko, Mlynek (PL); Ariel Almog, Kochav Yair (IL); Bar Or Shapira, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,937

(22) Filed: Jul. 24, 2022

(65) Prior Publication Data
US 2024/0031121 A1 Jan. 25, 2024

(51) Int. Cl.
*H03L 7/08* (2006.01)
*G06F 1/12* (2006.01)
*H04L 7/00* (2006.01)

(52) U.S. Cl.
CPC .................. *H04L 7/0012* (2013.01)

(58) Field of Classification Search
CPC ............... H04L 7/0012; H04L 29/0854; H04L 29/08072; H04L 29/06; H04L 29/0809; G06F 1/14
See application file for complete search history.

(56) References Cited

U.S. PATENT DOCUMENTS 5,392,421 A 2/1995 Lennartsson
5,402,394 A 3/1995 Turski
(Continued)

FOREIGN PATENT DOCUMENTS

CN 106817183 A 6/2017
CN 108829493 A 11/2018
(Continued)

OTHER PUBLICATIONS

U.S. Appl. No. 17/579,630 Office Action dated Oct. 24, 2022.
(Continued)

*Primary Examiner* — Abdullahi E Salad
(74) *Attorney, Agent, or Firm* — Kligler & Associates Patent Attorneys Ltd.

(57) ABSTRACT

In one embodiment, a communication system includes network devices, each comprising a network interface to receive at least one data stream, a given network device being configured to recover a remote clock from the at least one data stream received by the given network device, a frequency synthesizer to generate a clock signal and output the clock signal to each of the network devices, wherein the given network device is configured to find a clock frequency differential between the clock signal and the recovered remote clock, and provide a control signal to the frequency synthesizer responsively to the clock frequency differential, the control signal causes the frequency synthesizer to adjust the clock signal so as to iteratively reduce an absolute value of the clock frequency differential between the clock signal and the recovered remote clock.

18 Claims, 5 Drawing Sheets

(56) References Cited

U.S. PATENT DOCUMENTS

| | | |
|---|---|---|
| 5,416,808 A | 5/1995 | Witsaman et al. |
| 5,491,792 A | 2/1996 | Grisham et al. |
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |
| 6,556,636 B1 * | 4/2003 | Takagi ............ H04L 27/2338 375/345 |
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,300,749 B2 * | 10/2012 | Hadzic ............ H04J 3/0664 370/503 |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,824,903 B2 | 9/2014 | Christensen |
| 8,879,552 B2 | 11/2014 | Zheng |
| 8,930,647 B1 | 1/2015 | Smith |
| 9,344,265 B2 | 5/2016 | Karnes |
| 9,397,960 B2 | 7/2016 | Arad et al. |
| 9,549,234 B1 | 1/2017 | Mascitto |
| 9,753,854 B1 | 9/2017 | Bao |
| 9,942,025 B2 | 4/2018 | Bosch et al. |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,095,543 B1 | 10/2018 | Griffin et al. |
| 10,148,258 B2 | 12/2018 | Carlson et al. |
| 10,164,759 B1 | 12/2018 | Volpe |
| 10,320,646 B2 | 6/2019 | Mirsky et al. |
| 10,515,045 B1 | 12/2019 | Mattina |
| 10,637,776 B2 | 4/2020 | Iwasaki |
| 10,727,966 B1 | 7/2020 | Izenberg et al. |
| 10,778,361 B1 | 9/2020 | Almog et al. |
| 10,841,243 B2 | 11/2020 | Levi et al. |
| 10,879,910 B1 | 12/2020 | Franck et al. |
| 10,887,077 B1 | 1/2021 | Ivry |
| 11,070,224 B1 | 7/2021 | Faig et al. |
| 11,070,304 B1 | 7/2021 | Levi et al. |
| 11,128,500 B1 | 9/2021 | Mentovich et al. |
| 11,157,433 B2 | 10/2021 | Lederman et al. |
| 11,240,079 B1 | 2/2022 | Kushnir et al. |
| 11,303,363 B1 | 4/2022 | Mohr et al. |
| 11,336,383 B2 | 5/2022 | Mula et al. |
| 11,368,768 B2 | 6/2022 | Bakopoulos et al. |
| 11,379,334 B1 | 7/2022 | Srinivasan et al. |
| 11,388,263 B2 | 7/2022 | Levi et al. |
| 11,476,928 B2 | 10/2022 | Levi et al. |
| 2001/0006500 A1 | 7/2001 | Nakajima et al. |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0172181 A1 | 8/2005 | Huliehel |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139071 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0257458 A1 | 10/2009 | Cui et al. |
| 2010/0280858 A1 | 11/2010 | Bugenhagen |
| 2011/0182191 A1 | 7/2011 | Jackson |
| 2011/0194425 A1 | 8/2011 | Li et al. |
| 2012/0063556 A1 | 3/2012 | Hoang |
| 2012/0076319 A1 * | 3/2012 | Terwal ............ H04L 7/0008 381/86 |
| 2012/0301134 A1 | 11/2012 | Davari et al. |
| 2013/0039359 A1 | 2/2013 | Bedrosian |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0085141 A1 | 3/2014 | Geva et al. |
| 2014/0153680 A1 | 6/2014 | Garg et al. |
| 2014/0185216 A1 | 7/2014 | Zeng et al. |
| 2014/0185632 A1 | 7/2014 | Steiner et al. |
| 2014/0253387 A1 * | 9/2014 | Gunn ............ G01S 3/50 342/417 |
| 2014/0281036 A1 | 9/2014 | Cutler et al. |
| 2014/0301221 A1 | 10/2014 | Nadeau et al. |
| 2014/0321285 A1 | 10/2014 | Chew et al. |
| 2015/0019839 A1 | 1/2015 | Cardinell et al. |
| 2015/0078405 A1 | 3/2015 | Roberts |
| 2015/0092793 A1 | 4/2015 | Aweya |
| 2015/0127978 A1 | 5/2015 | Cui et al. |
| 2015/0163050 A1 * | 6/2015 | Han ............ G09G 5/008 375/362 |
| 2015/0318941 A1 | 11/2015 | Zheng et al. |
| 2016/0057518 A1 | 2/2016 | Neudorf |
| 2016/0072602 A1 | 3/2016 | Earl et al. |
| 2016/0110211 A1 | 4/2016 | Karnes |
| 2016/0140066 A1 | 5/2016 | Worrell et al. |
| 2016/0277138 A1 | 9/2016 | Garg et al. |
| 2016/0285574 A1 | 9/2016 | White et al. |
| 2016/0315756 A1 | 10/2016 | Tenea et al. |
| 2017/0005903 A1 | 1/2017 | Mirsky |
| 2017/0017604 A1 | 1/2017 | Chen et al. |
| 2017/0126589 A1 | 5/2017 | Estabrooks et al. |
| 2017/0160933 A1 | 6/2017 | De Jong et al. |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0188698 A1 * | 7/2018 | Dionne ............ G04R 20/04 |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 * | 1/2019 | Hossain ............ H03L 7/1974 |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |

(56) References Cited

U.S. PATENT DOCUMENTS

| | | |
|---|---|---|
| 2019/0220300 A1 | 7/2019 | Rosenboom |
| 2019/0265997 A1 | 8/2019 | Merrill et al. |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0162234 A1 | 5/2020 | Almog et al. |
| 2020/0169379 A1 | 5/2020 | Gaist et al. |
| 2020/0235905 A1 | 7/2020 | Su et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2021/0141413 A1 | 5/2021 | Levi et al. |
| 2021/0218431 A1 | 7/2021 | Narayanan et al. |
| 2021/0243140 A1 | 8/2021 | Levi et al. |
| 2021/0288785 A1 | 9/2021 | Faig et al. |
| 2021/0297151 A1 | 9/2021 | Levi et al. |
| 2021/0297230 A1 | 9/2021 | Dror et al. |
| 2021/0318978 A1 | 10/2021 | Hsung |
| 2021/0328900 A1 | 10/2021 | Sattinger et al. |
| 2021/0392065 A1 | 12/2021 | Sela et al. |
| 2021/0409031 A1 | 12/2021 | Ranganathan et al. |
| 2022/0006606 A1 | 1/2022 | Levi et al. |
| 2022/0021393 A1 | 1/2022 | Ravid et al. |
| 2022/0066978 A1 | 3/2022 | Mishra et al. |
| 2022/0086105 A1 | 3/2022 | Levi et al. |
| 2022/0173741 A1 | 6/2022 | Ravid et al. |
| 2022/0191275 A1 | 6/2022 | Levi et al. |
| 2022/0121691 A1 | 7/2022 | Mentovich et al. |
| 2022/0224500 A1 | 7/2022 | Mula et al. |
| 2022/0239549 A1 | 7/2022 | Zhao et al. |
| 2022/0342086 A1 | 10/2022 | Yoshida |

FOREIGN PATENT DOCUMENTS

| | | |
|---|---|---|
| EP | 1215559 B1 | 9/2007 |
| EP | 2770678 A1 | 8/2014 |
| JP | 2011091676 A | 5/2011 |
| TW | 498259 B | 8/2002 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

U.S. Appl. No. 17/579,630 Office Action dated Jan. 12, 2023.
U.S. Appl. No. 17/670,540 Office Action dated Jan. 18, 2023.
U.S. Appl. No. 17/191,736 Office Action dated Nov. 10, 2022.
Levi et al., U.S. Appl. No. 17/582,058, filed Jan. 24, 2022.
Levi et al., U.S. Appl. No. 17/246,730, filed May 3, 2021.
Levi et al., U.S. Appl. No. 17/315,396, filed May 10, 2021.
Levi et al., U.S. Appl. No. 17/359,667, filed Jun. 28, 2021.
Wasko et al., U.S. Appl. No. 17/520,674, filed Nov. 7, 2021.
Wasko et al., U.S. Appl. No. 17/582,058, filed Jan. 24, 2022.
Levi et al., U.S. Appl. No. 17/667,600, filed Feb. 9, 2022.
Shapira et al., U.S. Appl. No. 17/534,776, filed Nov. 24, 2021.
Shapira et al., U.S. Appl. No. 17/578,115, filed Jan. 18, 2022.
Kernen et al., U.S. Appl. No. 17/858,236, filed Jul. 6, 2022.
Zhang et al., "TI BAW technology enables ultra-low jitter clocks for highspeed networks", White paper, Texas Instruments, pp. 1-11, Feb. 2019.
Skywork Solutions Inc., "PCI Express 3.1 JITTER Requirements", AN562, pp. 1-16, year 2021.
Intel, "Can Altera GX/GT/GZ device high speed transceivers handle Spread Spectrum Clocking (SSC), as required by PCIe or SATA/SAS protocols?", p. 1, Sep. 11, 2012.
Pismenny et al., U.S. Appl. No. 17/824,954, filed May 26, 2022.
U.S. Appl. No. 17/191,736 Advisory Action dated Feb. 16, 2023.
"IEEE Standard for Local and Metropolitan Area Networks—Timing and Synchronization for Time-Sensitive Applications," IEEE Std 802.1AS-2020, IEEE Computer Society, pp. 1-421, year 2020.
U.S. Appl. No. 17/549,949 Office Action dated Mar. 30, 2023.
Corbett et al., "Spanner: Google's Globally Distributed Database," ACM Transactions on Computer Systems, vol. 31, No. 3, article 8, pp. 1-22, Aug. 2013.
U.S. Appl. No. 17/191,736 Office Action dated Jun. 26, 2023.
PCI-SIG, "PCI Express®—Base Specification—Revision 3.0," pp. 1-860, Nov. 10, 2010.
U.S. Appl. No. 17/578,115 Office Action dated Apr. 26, 2023.
U.S. Appl. No. 17/534,776 Office Action dated Jun. 29, 2023.
SiTime Corporation, "Sit5377—60 to 220 MHZ, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.
IEEE Standard 1588™—Apr. 2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.
Weibel et al., "Implementation and Performance of Time Stamping Techniques", 2004 Conference on IEEE 1588, pp. 1-29, Sep. 28, 2004.
Working Draft Project American National Standard T10/1799-D, "Information Technology—SCSI Block Commands—3 (SBC-3)", pp. 1-220, Revision 19, May 29, 2009.
"Infiniband Architecture: Specification vol. 1", pp. 1-1727, Release 1.2.1, Infiniband Trade Association, Nov. 2007.
Mellanox Technologies, "Mellanox ConnectX IB: Dual-Port InfiniBand Adapter Cards with PCI Express 2.0", pp. 1-2, USA, year 2008.
Wikipedia—"Precision Time Protocol", pp. 1-8, Aug. 24, 2019.
IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.
Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Texas Instruments, "LMK05318 Ultra-Low Jitter Network Synchronizer Clock With Two Frequency Domains," Product Folder, pp. 1-86, Dec. 2018.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
Wasko et al., U.S. Appl. No. 17/549,949, filed Dec. 14, 2021.
IPCLOCK, "IEEE 1588 Primer," ip-clock.com, pp. 1-3, May 1, 2017 (downloaded from https://web.archive.org/web/20170501192647/http://ip-clock.com/ieee-1588-primer/).
ITU-T Standard G.8261/Y.1361, "Timing and synchronization aspects in packet networks", pp. 1-120, Aug. 2019.
Levy et al., U.S. Appl. No. 17/313,026, filed May 6, 2021.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.
ITU-T Standard G.8262/Y.1362, "Timing characteristics of synchronous equipment slave clock", pp. 1-44, Nov. 2018.
ITU-T Standard G.8264/Y.1364, "Distribution of timing information through packet networks", pp. 1-42, Aug. 2017.
Manevich et al., U.S. Appl. No. 17/579,630, filed Jan. 20, 2022.
Levi et al., U.S. Appl. No. 17/868,841, filed Jul. 20, 2022.
Manevich et al., U.S. Appl. No. 17/867,779, filed Jul. 19, 2022.

(56) References Cited

OTHER PUBLICATIONS

Manevich et al., U.S. Appl. No. 17/885,604, filed Aug. 11, 2022.
U.S. Appl. No. 17/313,026 Office Action dated Dec. 19, 2023.
U.S. Appl. No. 17/191,736 Office Action dated Jan. 5, 2024.

* cited by examiner

SCALABLE SYNCHRONIZATION OF NETWORK DEVICES

FIELD OF THE INVENTION

The present invention relates to computer systems, and in particular, but not exclusively to, clock synchronization.

BACKGROUND

Clock synchronization among network devices is used in many network applications. One application of using a synchronized clock value is for measuring latency between two devices. If the clocks are not synchronized the resulting latency measurement will be inaccurate.

Synchronous Ethernet (SyncE) is an International Telecommunication Union Telecommunication (ITU-T) Standardization Sector standard for computer networking that facilitates the transference of clock signals over the Ethernet physical layer. In particular, SyncE enables clock synchronization inside a network with respect to a master device clock source or master clock. Each network element (e.g., a switch, a network interface card (NIC), or router) needs to recover the master clock from high-speed data received from the master device clock source and use the recovered master clock for its own data transmission in a manner such that the master clock spreads throughout the network.

Time, clock and frequency synchronization are crucial in some modern computer network applications. They enable 5G and 6G networks, and are proven to enhance the performance of certain data center workloads. SyncE standard enables improving (Precision Time Protocol) PTP accuracy by having less accumulated drift between PTP messages, and helps achieve an accurate time solution for an extended period after completely losing receipt of a PTP source.

SUMMARY

There is provided in accordance with an embodiment of the present disclosure, a communication system, including a plurality of network devices, each network device including a network interface to receive at least one data stream, a given one of the network devices being configured to recover a remote clock from the at least one data stream received by the given network device, and a frequency synthesizer to generate a clock signal and output the clock signal to each of the network devices, wherein the given network device is configured to find a clock frequency differential between the clock signal and the recovered remote clock, and provide a control signal to the frequency synthesizer responsively to the clock frequency differential, the control signal causes the frequency synthesizer to adjust the clock signal so as to iteratively reduce an absolute value of the clock frequency differential between the clock signal and the recovered remote clock.

Further in accordance with an embodiment of the present disclosure the frequency synthesizer includes a control input connector and at least one output connector, the given network device being connected to the control input connector, and the network devices being connected to the at least one output connector, the frequency synthesizer being configured to receive the control signal via the control input connector, and output the clock signal via the at least one output connector.

Still further in accordance with an embodiment of the present disclosure the given network device is configured to directly provide the control signal to the frequency synthesizer.

Additionally in accordance with an embodiment of the present disclosure, the system includes a processor to execute control software, and wherein the frequency synthesizer includes a control input connector and at least one output connector, another one of the network devices is connected to the control input connector, the network devices are connected to the at least one output connector, the given network device is configured to provide a first control signal to the control software, which is configured to provide a second control signal to the frequency synthesizer, and the frequency synthesizer is configured to receive the second control signal via the control input connector, and output the clock signal via the at least one output connector.

Moreover, in accordance with an embodiment of the present disclosure the control software is configured to provide a third control signal to the other network device, which is configured to provide the second control signal to the frequency synthesizer.

Further in accordance with an embodiment of the present disclosure the frequency synthesizer includes at least one control input connector and at least one output connector, the network devices are connected to the at least one control input connector and the at least one output connector, a first network device of the network devices is configured to recover a first remote clock from a first data stream received by the first network device, find a first clock frequency differential between the clock signal and the recovered first remote clock, and provide a first control signal to the frequency synthesizer responsively to the first clock frequency differential, the first control signal causes the frequency synthesizer to adjust the clock signal so as to iteratively reduce an absolute value of the first clock frequency differential between the clock signal and the recovered first remote clock, the frequency synthesizer is configured to receive the first control signal from the first network device via the at least one control input connector, and output the clock signal via the at least one output connector, a second network device of the network devices is configured to recover a second remote clock from a second data stream received by the second network device, find a second clock frequency differential between the clock signal and the recovered second remote clock, and provide a second control signal to the frequency synthesizer responsively to the second clock frequency differential, the second control signal causes the frequency synthesizer to adjust the clock signal so as to iteratively reduce an absolute value of the second clock frequency differential between the clock signal and the recovered second remote clock, and the frequency synthesizer is configured to receive the second control signal from the second network device via the at least one control input connector, and output the clock signal via the at least one output connector.

Still further in accordance with an embodiment of the present disclosure, the system includes a processor to execute control software to receive Synchronous Ethernet (SyncE) messages, and first select the a network interface of the first network device as receiving a first master clock with which to synchronize the network devices and then select the network interface of the second network device as receiving a second master clock with which to synchronize the network devices, responsively to the SyncE messages.

Additionally in accordance with an embodiment of the present disclosure the first network device is configured to directly provide the first control signal to the frequency synthesizer, and the second network device is configured to directly provide the second control signal to the frequency synthesizer.

Moreover, in accordance with an embodiment of the present disclosure the frequency synthesizer includes a clock input connected to an output of an oscillator and a control input connected to an output of the given network device to receive the control signal.

Further in accordance with an embodiment of the present disclosure the frequency synthesizer is a frequency jitter synchronizer.

Still further in accordance with an embodiment of the present disclosure the frequency synthesizer is a jitter network synchronizer clock.

Additionally in accordance with an embodiment of the present disclosure, the system includes a processor to execute control software to receive Synchronous Ethernet (Synch) messages, and select the network interface of the given network device as receiving a master clock with which to synchronize the network devices responsively to at least one of the SyncF messages.

Moreover, in accordance with an embodiment of the present disclosure each of the network devices is included in an independent application-specific integrated circuit (ASIC).

Further in accordance with an embodiment of the present disclosure, the system includes a printed circuit board on which the ASIC of each of the network devices is disposed and the frequency synthesizer.

Still further in accordance with an embodiment of the present disclosure, the system includes printed circuit board traces connecting outputs of the frequency synthesizer to the network devices, wherein each of the printed circuit board traces are about the same length.

Additionally in accordance with an embodiment of the present disclosure, the system includes at least one addition frequency synthesizer connected to an output of the frequency synthesizer and configured to output clock signals to respective ones of the network devices.

Moreover, in accordance with an embodiment of the present disclosure, the system includes a signal divider device connected to an output of the frequency synthesizer and configured to divide the clock signal into clock signals for output to respective ones of the network devices.

There is also provided in accordance with another embodiment of the present disclosure, a communication method, including each network device of a plurality of network devices receiving at least one data stream, a given one of the network devices recovering a remote clock from the at least one data stream received by the given network device, a frequency synthesizer generating a clock signal and outputting the clock signal to each of the network devices, the given network device finding a clock frequency differential between the clock signal and the recovered remote clock, and the given network device providing a control signal to the frequency synthesizer responsively to the clock frequency differential, and the frequency synthesizer adjusting the clock signal responsively to the control signal so as to iteratively reduce an absolute value of the clock frequency differential between the clock signal and the recovered remote clock.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
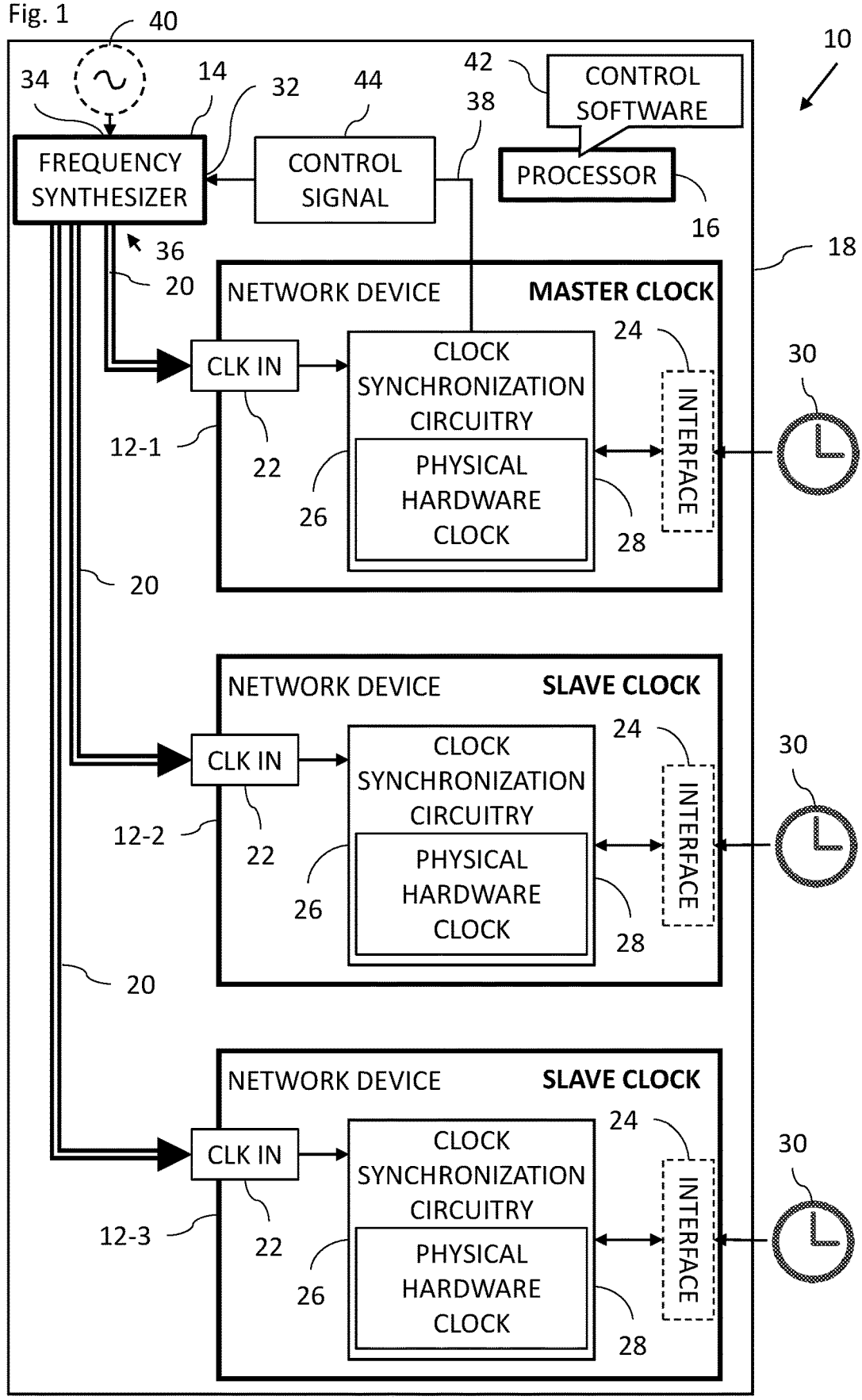
FIG. 1 is a block diagram view of a communication system constructed and operative in accordance with an embodiment of the present invention.

Clock synchronization between network devices remains a challenge in the networking industry due to continued demand for tighter clock synchronization. In many scenarios, network devices in a system need to be synchronized accurately. One solution is to connect the network devices together and synchronize from one device to the other devices by passing clock signals between the network devices. Such a solution may be inflexible and lack accuracy in some cases.

Embodiments of the present invention address some of the above drawbacks by providing a network synchronization system (e.g., on a printed circuit board (PCB)) including multiple network devices (e.g., separate application-specific integrated circuits (ASICs) mounted on the PCB), with fan-out circuitry to push the same clock frequency signal from a frequency synthesizer to the network devices.

A control input of the frequency synthesizer is connected, via a control channel, to one or more of the network devices to receive a control signal from the network device(s). The control signal instructs the frequency synthesizer whether to increase or decrease the frequency of a clock signal generated by the frequency synthesizer. One or more clock outputs of the frequency synthesizer carry the clock signal generated by the frequency synthesizer to all of the network devices (e.g., on the PCB) so that all the network devices are synchronized to the same clock frequency.

One of the network devices (which may be selected as a master clock of the network devices) recovers a remote clock and finds a clock frequency differential between the recovered remote clock and the clock signal received from the frequency synthesizer. The master clock network device generates a control signal to be sent to the frequency synthesizer based on the clock frequency differential. In response to receiving the control signal, the frequency synthesizer adjusts the clock frequency signal provided to the network devices thereby moving the clock signal closer to the recovered remote clock. In this manner, the frequency synthesizer adjusts the clock signal so as to iteratively reduce an absolute value of the clock frequency differential between the clock signal and the recovered remote clock.

In some embodiments, the control input of the frequency synthesizer is connected to a single network device (on the PCB), which acts as the "synchronization master" for all the network devices, and all clock frequency adjustment operations pass through the synchronization master. For example, if a SyncE external source is connected to a given network device other than the synchronization master, the given network device provides a first control signal to the synchronization master, which in turn passes a second control signal (based on the first control signal or the same as the first control signal) to the frequency synthesizer. This may be achieved by passing frequency offset information (e.g., the control signal) through software, so that the information would pass from the synchronization master to the frequency synthesizer, which eventually feeds the network devices with the clock frequency signal.

In some embodiments, all of the network devices (on the PCB) are connected via respective control channels to the network synchronizer control input (e.g., in a multi-master I²C topology), with each network device serving as the synchronization master, as long as only one device is providing a control signal to the frequency synthesizer at any given time. In this manner, a SyncE control loop may be closed between the synchronization master and the frequency synthesizer without passing frequency offset information through software. This embodiment is faster, and a more stable control loop can be achieved since no latency jitter is introduced by software and a central processing unit (CPU).

Software should be aware of the control channel connectivity of the board, whether all network devices are connected to the frequency synthesizer, or only one or a subset of network devices are connected to the frequency synthesizer so that for devices not directly connected to the frequency synthesizer, frequency offset information is passed through the software and redirected to a device which has a direct control channel with the frequency synthesizer.

In some embodiments, none of the network devices are connected via a direct control channel to the frequency synthesizer and all frequency offset information is passed through the software and passed via a direct control channel between the CPU and the frequency synthesizer.

In some embodiments, one or more signal dividers or frequency synthesizers may be used to split the output clock synchronization signals for receipt by multiple network devices (on the PCB).

System Description

Figure 2:
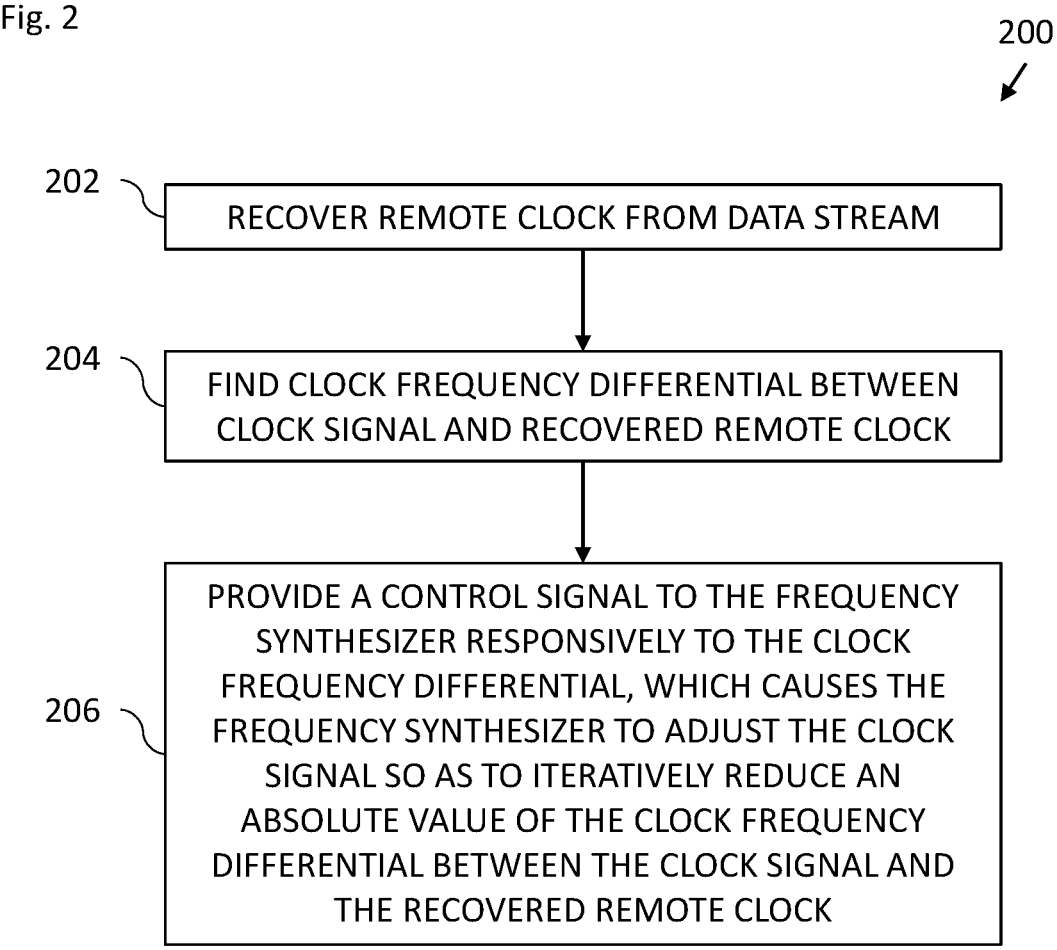
FIG. 2 is a flowchart including steps in a method of operation of the system of FIG. 1.

Reference is now made to FIG. 1, which is a block diagram view of a communication system 10 constructed and operative in accordance with an embodiment of the present invention. Reference is also made to FIG. 2, which is a flowchart 200 including steps in a method of operation of the system 10 of FIG. 1.

The system 10 include a plurality of network devices 12, a frequency synthesizer 14, and a processor 16. FIG. 1 shows three network devices 12 by way of example, including network devices 12-1, 12-2, 12-3. In some embodiments, the system 10 includes a printed circuit board 18 on which the network devices 12, the frequency synthesizer 14, and the processor 16 are disposed (e.g., mounted). In some embodiments, each of the network devices 12 is included in an independent application-specific integrated circuit (ASIC).

The system 10 may also include printed circuit board traces 20 connecting outputs of the frequency synthesizer 14 to clock input ports 22 of respective ones of the network devices 12. In some embodiments, the printed circuit board traces 20 are about the same length (e.g., within a tolerance of 5%). In other embodiments, the traces 20 are different lengths.

Each network device 12 includes a network interface 24, clock synchronization circuitry 26, the clock input port 22, and may include a physical hardware clock 28. The network interface 24 is configured to receive at least one data stream, which may include clock frequency information (e.g., encoded in the data stream(s)) supplied by a remote master clock 30.

The frequency synthesizer 14 may be any suitable frequency synthesizer such as a frequency jitter synchronizer and/or jitter network synchronizer clock. An example of a suitable frequency synthesizer 14 is Ultra-Low Jitter Network Synchronizer Clock LMK05318 commercially available from Texas Instruments Inc., 12500 TI Boulevard Dallas, Texas 75243 USA.

The frequency synthesizer 14 includes a control input connector 32, a clock input 34, and at least one output connector 36. In the example of FIG. 1, network device 12-1 is connected to the control input connector 32 via a suitable connection 38 (e.g., a trace on the printed circuit board 18) so that the frequency synthesizer 14 may receive a control signal 44 from the network device 12-1. The output connectors 36 are connected to the clock input ports 22 of the network devices 12 via the traces 20.

In some embodiments, the system 10 also includes an oscillator 40. The output of the oscillator 40 is connected to the clock input 34 of the frequency synthesizer 14. The frequency synthesizer 14 is configured to generate a clock signal and output the clock signal to the clock input port 22 of each of the network devices 12. The clock signal frequency is based on the frequency of the signal output by the oscillator 40 and may be adjusted based on the received control signal 44.

The processor 16 is configured to execute control software 42 to receive Synchronous Ethernet (SyncE) messages; and select the (port of the) network interface 24 of one of the network devices 12 receiving the most accurate remote clock. In the example of FIG. 1, responsively to one or more of the received SyncE messages, the control software 42 selects one of the ports of the network interface 24 of network device 12-1 as receiving a master clock with which to synchronize the network devices 12.

The network device 12-1 is configured to: recover a remote clock from the data stream(s) received by the network interface 24 of the network device 12-1 (block 202); and find a clock frequency differential between the clock signal (received from the frequency synthesizer 14) and the recovered remote clock (block 204). The network device 12-1 is configured to generate the control signal 44 and provide the control signal 44 to the frequency synthesizer 14 responsively to the clock frequency differential (block 206). For example, if the recovered remote clock is faster than the clock signal then the control signal 44 commands the frequency synthesizer 14 to quicken the clock signal, and vice-versa. In the example of FIG. 1, the network device 12-1 is configured to directly provide the control signal 44 to the frequency synthesizer 14 via the connection 38. The term "directly provide" as used in the specification and claims is defined as providing the control signal 44 to the frequency synthesizer 14 without having to pass the control signal 44 via software, e.g., the control software 42 running on the processor 16. The control signal 44 causes the frequency synthesizer 14 to adjust the clock signal so as to iteratively reduce an absolute value of the clock frequency differential between the clock signal and the recovered remote clock.

The frequency synthesizer 14 is configured to: receive the control signal 44 via the control input connector 32; adjust the clock signal responsively to the control signal 44; and output the clock signal from the output connectors 36 via the traces 20 to the respective clock input ports 22 of the network devices 12. Therefore, traces 20 and connection 38 form a control loop between the network device 12-1 and the frequency synthesizer 14 to synchronize the clock signal with the recovered remote clock. The clock signal is also fed to all the now network devices 12 in the system 10.

Figure 3:
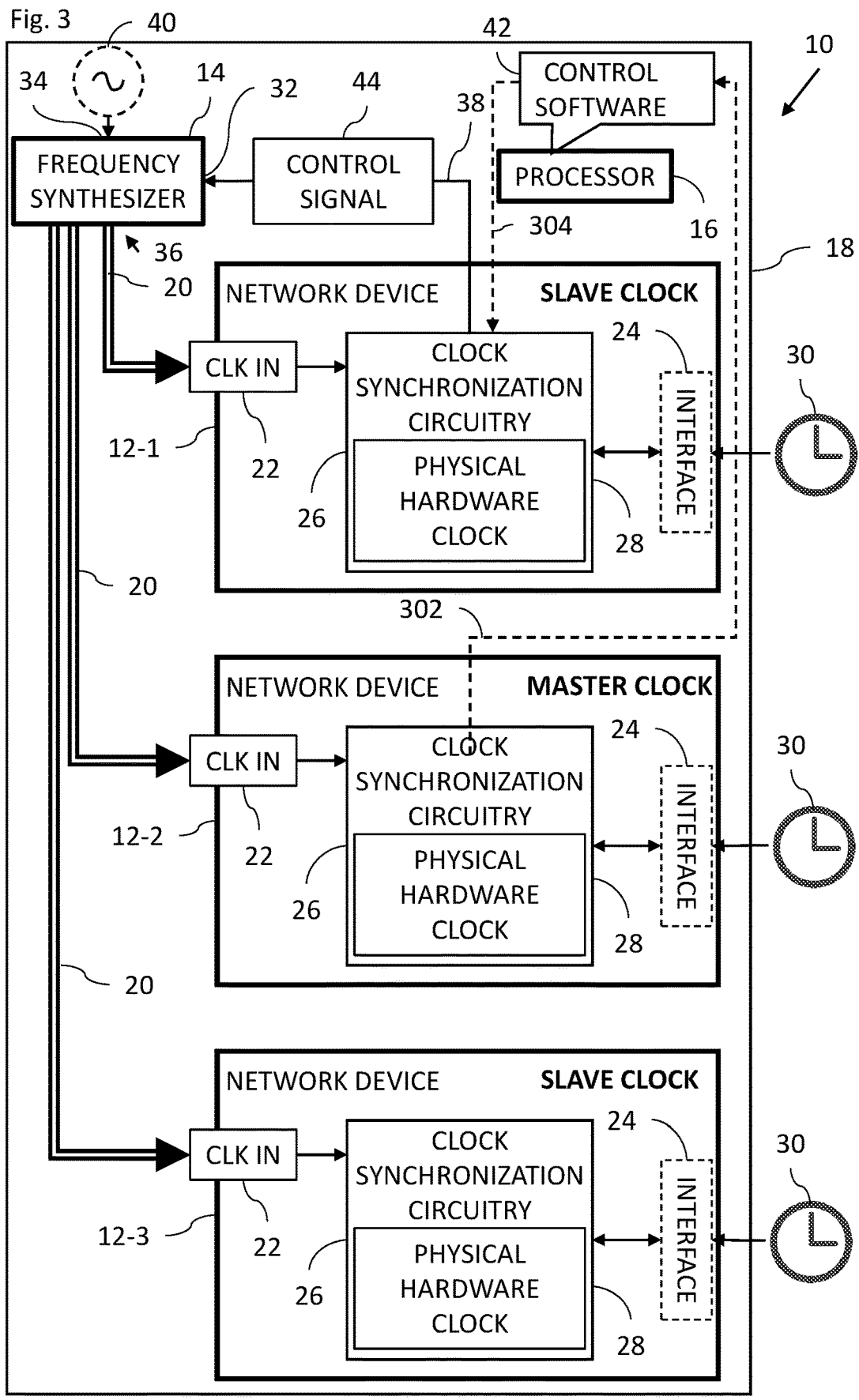
FIG. 3 is a block diagram view of the communication system of FIG. 1 showing another network device assigned as a master clock and synchronization of clock frequency via control software and via another network device.

Reference is now made to FIG. 3, which is a block diagram view of the communication system 10 of FIG. 1 showing network device 12-2 now assigned as a master clock, and synchronization of clock frequency via control software 42 and via network device 12-1. In the example of FIG. 3, the control software 42 selects one of the ports of the network interface 24 of network device 12-2 as receiving a master clock with which to synchronize the network devices 12 responsively to one or more of the received SyncE messages. As the network device 12-2 is not directly connected to the control input connector 32 of the frequency synthesizer 14, the network device 12-2 is configured to provide (e.g., send) a first control signal to the control software 42 (line 302), which is configured to provide (e.g., send) the first control signal, or a second control signal based on the first control signal to the network device 12-1 (line 304). The network device 12-1 then sends the first control signal, or the second control signal, or a third control signal based on the first or second control signal, via the connection 38 to the control input connector 32 of the frequency synthesizer 14, which is configured to receive the first or second or third control signal.

Figure 4:
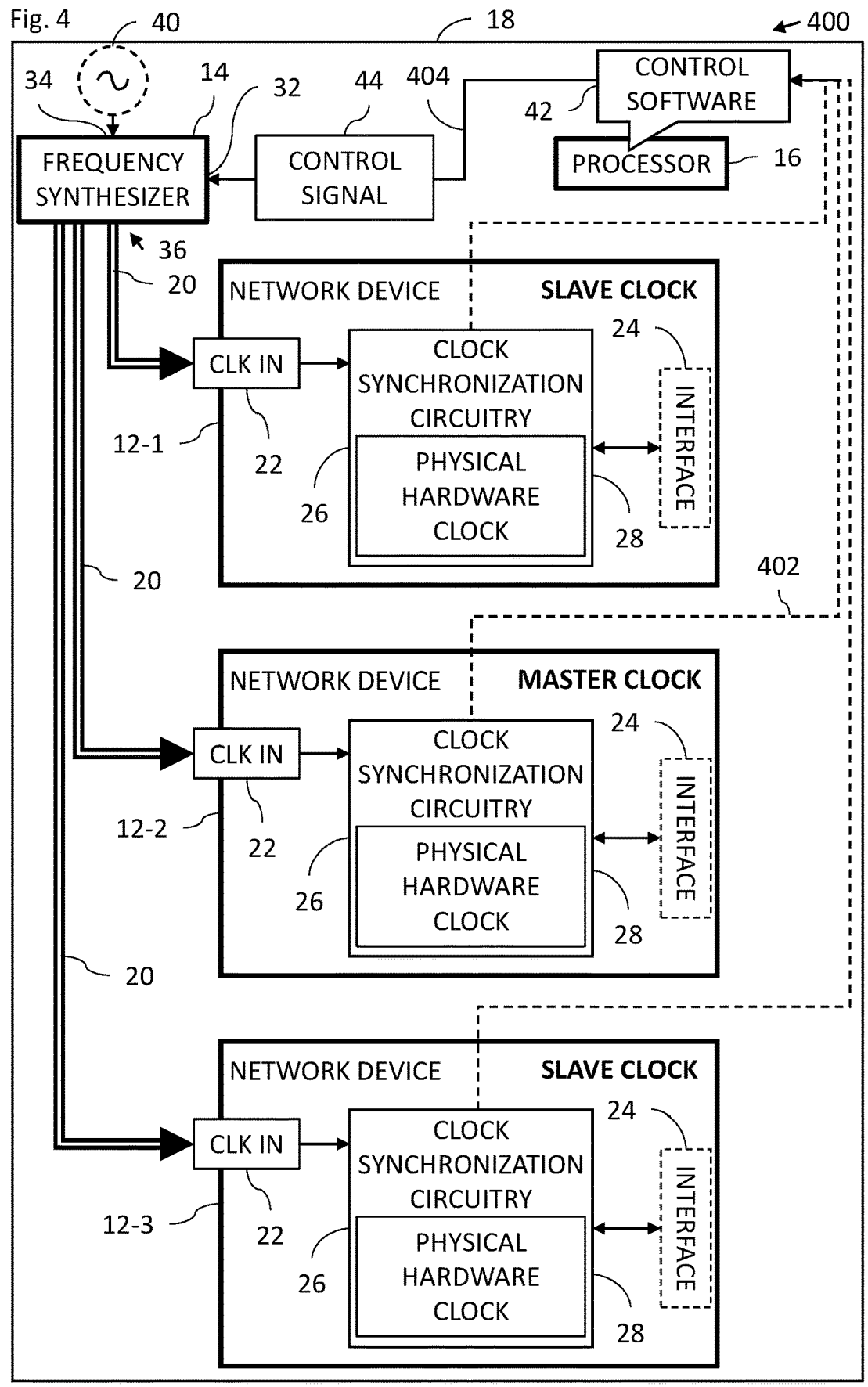
FIG. 4 is a block diagram view of a communication system constructed and operative in accordance with a first alternative embodiment of the present invention showing all the network devices being able to synchronize clock frequency via a processor running control software.

Reference is now made to FIG. 4, which is a block diagram view of a communication system 400 constructed and operative in accordance with a first alternative embodiment of the present invention showing all the network devices 12 being able to synchronize clock frequency via the processor 16 running control software 42. The communication system 400 is substantially the same as the system 10 except for the differences described below. In the example of FIG. 4, none of the network devices 12 are directly connected to the frequency synthesizer 14, instead the processor 16 is connected to the frequency synthesizer 14 and passes control signals from the network devices 12 to the frequency synthesizer 14 optionally changing the control signals in the software.

In the example of FIG. 4, the control software 42 selects one of the ports of the network interface 24 of network device 12-2 as receiving a master clock with which to synchronize the network devices 12 responsively to one or more of the received SyncE messages. As the network device 12-2 is not directly connected to the control input connector 32 of the frequency synthesizer 14, the network device 12-2 is configured to provide (e.g., send) a first control signal to the control software 42 (line 402), which is configured to provide (e.g., send) the first control signal, or a second control signal based on the first control signal to the control input connector 32 of the frequency synthesizer 14 (line 404), which is configured to receive the first or second control signal. The control software 42 may also instruct the non-master network devices 12 to not compute differences between their recovered remote clocks and the clock signal and/or not send control signals to the frequency synthesizer 14 via the control software 42. Alternatively, the control software 42 could ignore any control signals arriving from the non-master network devices 12.

Figure 5:
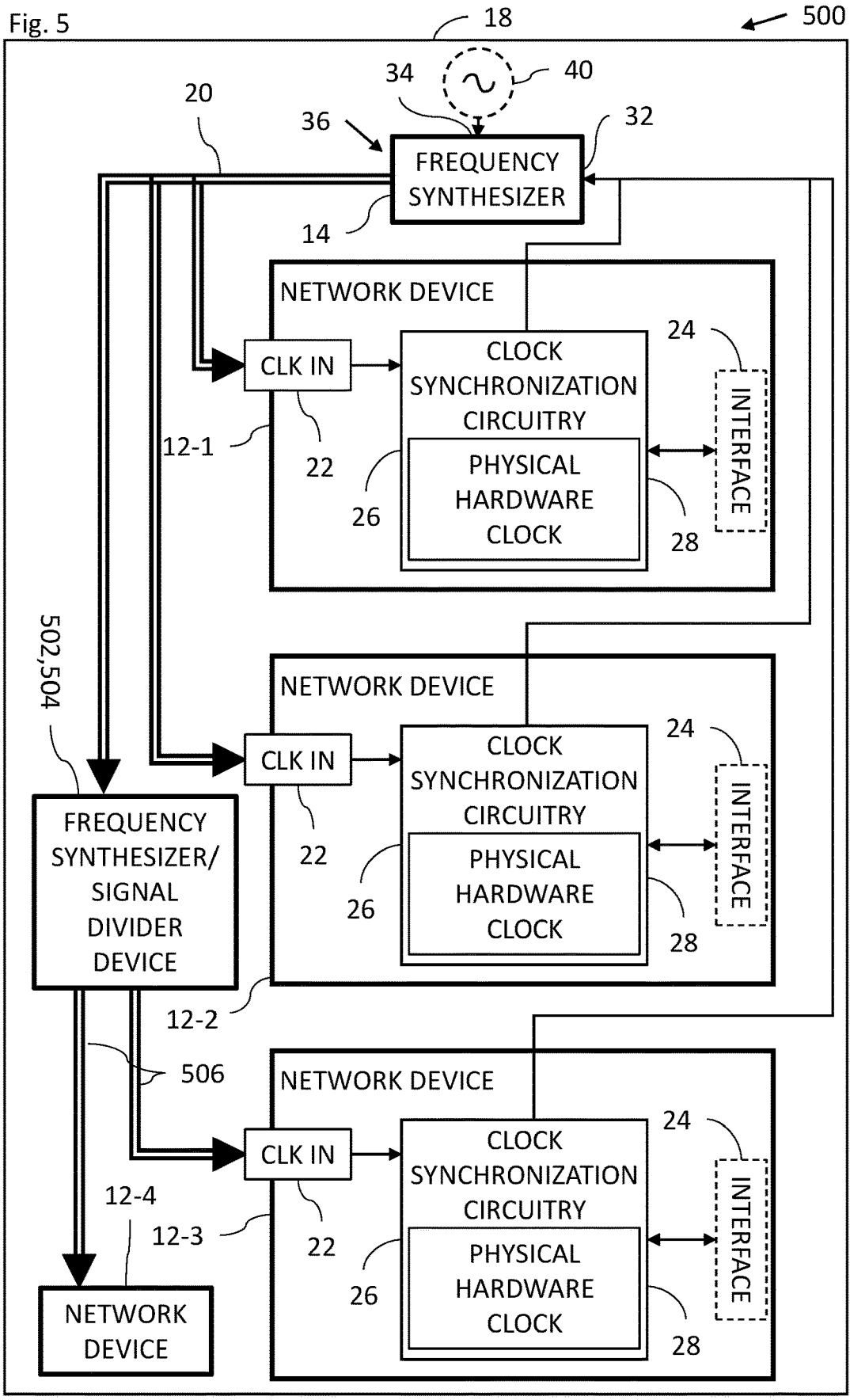
FIG. 5 a block diagram view of a communication system constructed and operative in accordance with a second alternative embodiment of the present invention showing all the network devices being directly connected to a frequency synthesizer.

Reference is now made to FIG. 5, which a block diagram view of a communication system 500 constructed and operative in accordance with a second alternative embodiment of the present invention showing all the network devices 12 being directly connected to the frequency synthesizer 14. The communication system 500 is substantially the same as the system 10 except for the differences described below. All the network devices 12 are connected to the control input connector 32 and the output connectors 36.

One of the network devices 12 is assigned as the master network device 12 by the control software 42. The control software 42 may also instructs the non-master network devices 12 to not compute a difference between their recovered remote clocks and the clock signal and/or not send a control signal to the frequency synthesizer 14 via the control software 42.

Any one of the network devices 12 (e.g., the master network device 12) may be configured to: recover a remote clock from a data stream received by that network device 12; find a clock frequency differential between the clock signal (received from frequency synthesizer 14) and the recovered remote clock; and directly provide (i.e., not via software) a control signal to the frequency synthesizer 14 responsively to the clock frequency differential. The control signal causes the frequency synthesizer 14 to adjust the clock signal so as to iteratively reduce an absolute value of the clock frequency differential between the clock signal and the recovered remote clock. The frequency synthesizer 14 is configured to: receive the control signal from that network device 12 via the control input connector 32; and output the clock signal via the output connectors 36 to the network devices 12.

In some cases, the frequency synthesizer 14 may not include enough output connectors 36 to connect to each of the network devices 12. Therefore, the system 10 may include one or more signal divider devices 502 and/or one or more additional frequency synthesizers 504 to receive the clock signal from the frequency synthesizer 14 and output multiple copies of the clock signal to connected network devices 12. In the example of FIG. 5, one of the traces 20 connects the frequency synthesizer 14 to the signal divider device 502 (or the frequency synthesizer 504), which provides the clock signal to network devices 12-3, 12-4 via traces 506.

In some embodiments, the signal divider devices 502 are configured to divide a received clock signal into multiple clock signals for output to respective network devices 12. In some embodiments, the frequency synthesizers 504 are configured to output clock signals to respective network devices 12. In some embodiments, any combination of the signal divider devices 502 and/or the frequency synthesizers 504 may be arranged in a tree structure to divide the clock signals among the network devices 12, for example using multiple levels of signal divider devices 502 and/or frequency synthesizers 504.

In practice, some or all of the functions of the clock synchronization circuitry 26 may be combined in a single physical component or, alternatively, implemented using multiple physical components. These physical components may comprise hard-wired or programmable devices, or a combination of the two. In some embodiments, at least some of the functions of the clock synchronization circuitry 26 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

In practice, some or all of the functions of the processor 16 may be combined in a single physical component or, alternatively, implemented using multiple physical components. These physical components may comprise hard-wired or programmable devices, or a combination of the two. In some embodiments, at least some of the functions of the processor 16 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A communication system, comprising:
a plurality of network devices, each network device comprising a network interface to receive at least one data stream, a given one of the network devices being configured to recover a remote clock from the at least one data stream received by the given network device; and
a frequency synthesizer to generate a clock signal and output the clock signal to each of the network devices, wherein the given network device is configured to:
find a clock frequency differential between the clock signal and the recovered remote clock; and
provide a control signal to the frequency synthesizer responsively to the clock frequency differential, the control signal causes the frequency synthesizer to adjust the clock signal so as to iteratively reduce an absolute value of the clock frequency differential between the clock signal and the recovered remote clock.

2. The system according to claim 1, wherein the frequency synthesizer includes a control input connector and at least one output connector, the given network device being connected to the control input connector, and the network devices being connected to the at least one output connector, the frequency synthesizer being configured to: receive the control signal via the control input connector; and output the clock signal via the at least one output connector.

3. The system according to claim 2, wherein the given network device is configured to directly provide the control signal to the frequency synthesizer.

4. The system according to claim 1, further comprising a processor to execute control software, and wherein:
the frequency synthesizer includes a control input connector and at least one output connector;
another one of the network devices is connected to the control input connector;
the network devices are connected to the at least one output connector;
the given network device is configured to provide a first control signal to the control software, which is configured to provide a second control signal to the frequency synthesizer; and
the frequency synthesizer is configured to: receive the second control signal via the control input connector; and output the clock signal via the at least one output connector.

5. The system according to claim 4, wherein the control software is configured to provide a third control signal to the other network device, which is configured to provide the second control signal to the frequency synthesizer.

6. The system according to claim 1, wherein:
the frequency synthesizer includes at least one control input connector and at least one output connector;
the network devices are connected to the at least one control input connector and the at least one output connector;
a first network device of the network devices is configured to:
recover a first remote clock from a first data stream received by the first network device;
find a first clock frequency differential between the clock signal and the recovered first remote clock; and
provide a first control signal to the frequency synthesizer responsively to the first clock frequency differential, the first control signal causes the frequency synthesizer to adjust the clock signal so as to iteratively reduce an absolute value of the first clock frequency differential between the clock signal and the recovered first remote clock;
the frequency synthesizer is configured to: receive the first control signal from the first network device via the at least one control input connector; and output the clock signal via the at least one output connector;
a second network device of the network devices is configured to:
recover a second remote clock from a second data stream received by the second network device;
find a second clock frequency differential between the clock signal and the recovered second remote clock; and
provide a second control signal to the frequency synthesizer responsively to the second clock frequency differential, the second control signal causes the frequency synthesizer to adjust the clock signal so as to iteratively reduce an absolute value of the second clock frequency differential between the clock signal and the recovered second remote clock; and
the frequency synthesizer is configured to: receive the second control signal from the second network device via the at least one control input connector; and output the clock signal via the at least one output connector.

7. The system according to claim 6, further comprising a processor to execute control software to: receive Synchronous Ethernet (SyncE) messages; and first select the a network interface of the first network device as receiving a first master clock with which to synchronize the network devices and then select the network interface of the second network device as receiving a second master clock with which to synchronize the network devices, responsively to the SyncE messages.

8. The system according to claim 6, wherein:
the first network device is configured to directly provide the first control signal to the frequency synthesizer; and the second network device is configured to directly provide the second control signal to the frequency synthesizer.

9. The system according to claim 1, wherein the frequency synthesizer includes a clock input connected to an output of an oscillator and a control input connected to an output of the given network device to receive the control signal.

10. The system according to claim 1, wherein the frequency synthesizer is a frequency jitter synchronizer.

11. The system according to claim 1, wherein the frequency synthesizer is a jitter network synchronizer clock.

12. The system according to claim 1, further comprising a processor to execute control software to: receive Synchronous Ethernet (SyncE) messages; and select the network interface of the given network device as receiving a master clock with which to synchronize the network devices responsively to at least one of the SyncE messages.

13. The system according to claim 1, wherein each of the network devices is included in an independent application-specific integrated circuit (ASIC).

14. The system according to claim 13, further comprising a printed circuit board on which the ASIC of each of the network devices is disposed and the frequency synthesizer.

15. The system according to claim 14, further comprising printed circuit board traces connecting outputs of the frequency synthesizer to the network devices, wherein each of the printed circuit board traces are about the same length.

16. The system according to claim 1, further comprising at least one addition frequency synthesizer connected to an output of the frequency synthesizer and configured to output clock signals to respective ones of the network devices.

17. The system according to claim 1, further comprising a signal divider device connected to an output of the frequency synthesizer and configured to divide the clock signal into clock signals for output to respective ones of the network devices.

18. A communication method, comprising:
each network device of a plurality of network devices receiving at least one data stream;
a given one of the network devices recovering a remote clock from the at least one data stream received by the given network device;
a frequency synthesizer generating a clock signal and outputting the clock signal to each of the network devices;
the given network device finding a clock frequency differential between the clock signal and the recovered remote clock; and
the given network device providing a control signal to the frequency synthesizer responsively to the clock frequency differential; and
the frequency synthesizer adjusting the clock signal responsively to the control signal so as to iteratively reduce an absolute value of the clock frequency differential between the clock signal and the recovered remote clock.

* * * * *